(No Model.)
P. BOWE.
BATTERY CONNECTION FOR ELECTRIC CONDUCTORS.
No. 368,321. Patented Aug. 16, 1887.
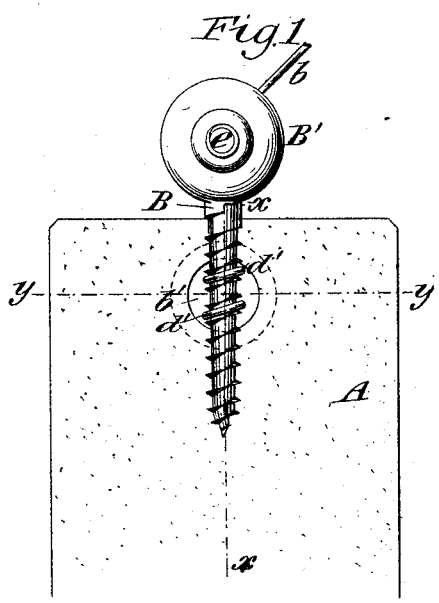
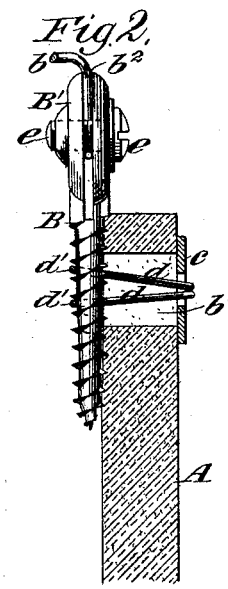
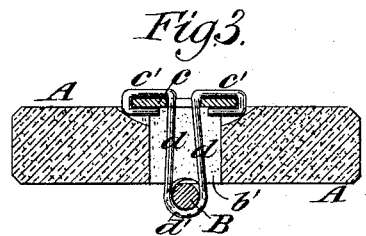
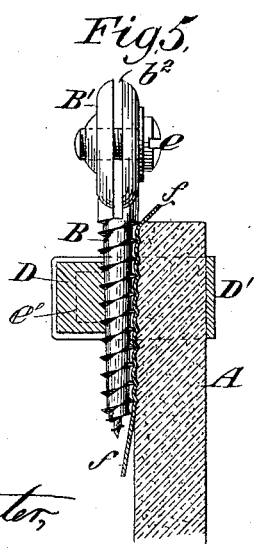
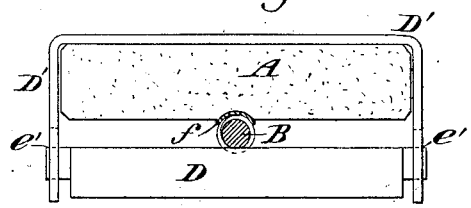
Witnesses.
Emil Herter
Henry J. McBride
Inventor.
Patrick Bowe
by his Attys
Brown & Hall

UNITED STATES PATENT OFFICE.

PATRICK BOWE, OF JERSEY CITY, NEW JERSEY.

BATTERY-CONNECTION FOR ELECTRIC CONDUCTORS.

SPECIFICATION forming part of Letters Patent No. 368,321, dated August 16, 1887.

Application filed May 3, 1887. Serial No. 236,911. (No model.)

*To all whom it may concern:*

Be it known that I, PATRICK BOWE, of Jersey City, in the county of Hudson and State of New Jersey, have invented a new and useful Improvement in Battery-Connections for Electric Conductors, of which the following is a specification.

Although my invention may be employed in connecting conducting-wires electrically with battery elements or plates of different kinds, it is more particularly intended for making connection with carbon plates or elements. It is common to provide carbon plates with clamps which are secured upon them by clamping-screws, and with which the conductors are connected, and in the use of batteries having such connections the salt deposits between the clamp and the carbon surface and very frequently impairs or entirely interrupts the electric current.

The object of my invention is to provide a connection of very simple character which will not be open to this serious objection.

In carrying out my invention I secure a nut section or abutment at a very little distance from the face of the element, and I insert parallel with the face of the element, and between it and the nut section or abutment, as in a nut, a screw to which a wire is to be attached at a distance from the element. I may introduce a thin strip of platinum or other metal between the screw and the face of the element, the metal being so thin that the thread of the screw will indent itself thereinto. The nut section or abutment may advantageously consist of a washer having a looped or slotted shank, which extends through an opening in the plate and beyond the face thereof, and which receives through the loop or slot in its shank the screw which is entered between the face of the element and the concaved bearing afforded in the shank, as in a nut.

The invention likewise consists in a screw-connection having a broad flat head split or slotted in the direction of its diameter or greatest width to form clamping-jaws and a clamping-screw inserted in these jaws for drawing them together and upon an introduced wire or conductor.

In the accompanying drawings, Figure 1 represents a battery element consisting of a carbon plate having a conductor-connection combined therewith according to my invention. Fig. 2 is a vertical section through the plate on the plane of the dotted line $x\,x$, Fig. 1. Fig. 3 is a horizontal section on the plane of the dotted line $y\,y$, Fig. 1. Fig. 4 represents a device hereinafter described, and which in part forms the nut receiving the screw-connection; and Figs. 5 and 6 are respectively a vertical section and a sectional plan embodying a modification of my invention.

Similar letters of reference designate corresponding parts in all the figures.

A designates a carbon or other battery element, and B designates a screw-connection whereby electric contact is maintained between a wire or electric conductor, $b$, and the plate A.

As here represented, the plate A has in it an opening, $b'$, which receives a device consisting, as here shown, of a washer, $c$, bearing against one face of the plate A, and a looped or slotted shank, $d$, passing through the opening $b'$ and projecting beyond the opposite face of the plate. As here represented, the shank $d$ is formed by bending the wire in suitable shape and clamping its ends upon the washer $c$, as shown at $c'$, and the curved or bowed outer end portions of the wires, as shown at $d'$, constitute a bearing which receives the screw B. The screw may have upon it a thread similar to that of a wood-screw, and after the slotted or looped shank $d$ is inserted through the opening $b'$ the screw B is inserted through such shank in a direction parallel with the face of the plate A and between the face of such plate and the concave bearings $d'$, formed by the wire of the shank $d$. The screw may thus be inserted as in a nut, and by turning it in snugly a very intimate contact is established between the carbon plate A and the screw, and a permanent and reliable connection of the wire or conductor $b$ with the plate A is established. The concave bearing $d'$, formed by the loops of wire in the shank $d$, may be considered as a nut section or abutment with which the thread of the screw B engages when inserted, as shown in Figs. 1 and 2. If the connection becomes loose at any time, all that is necessary is to give the screw B another turn more or less, and, owing to the screw having preferably a slight taper, all lost motion is prevented. Any turning of the screw B will scrape off the corroded coating, which might impair contact. With this connection there will be no opportunity for the salt to deposit between the screw and the surface of the plate A, so as to impair the electric communication. I have represented the screw as having a broad flattened head, B', split or slotted at $b^2$ in the direction of its diameter or greatest width, so as to form clamping-jaws, and having a clamping or binding screw, $e$, as inserted through these jaws. The jaws formed by the split or slot $b^2$ will yield sufficiently to enable them, by the action of the screw $e$, to be clamped firmly upon the wire $b$.

In Figs. 5 and 6 I have represented a slight modification of my invention, wherein the abutment or nut section, between which and the plate A the screw B is inserted, consists of a cross bar or piece, D, which may be of wood, if desired, or analogous soft material, and which has its ends mortised or otherwise fitted at $e'$ into the ends of a loop, D', embracing the plate A. When the tapering screw B is inserted downward parallel with the face of the plate A and between its face and the abutment or nut section D, a very firm and intimate contact of the screw-thread with the surface of the plate A will be secured. I may, if desired, introduce a thin strip of platinum or other metal, $f$, between the screw B and the plate A, as shown in Fig. 5, such metal being sufficiently thin, so that it will be indented by the screw-thread. This modification of the invention provides for a very secure connection of the conductor $b$, because the thread of the screw B will be sufficiently sharp, so that it will indent into the wood or other comparatively soft abutment D, and the latter will therefore constitute a nut section.

I am aware of the patent to Johnson, No. 342,751, dated May 25, 1886, and do not claim the device there shown as included in my invention. That patent is simply for connecting a wire with a metal part and involves the formation of a screw-threaded hole in the part, with a groove in which the wire lies, so that a screw inserted in the hole will cut into the wire. In my case the screw is not inserted through a hole in the part, but parallel with the face of the part, and the wire is connected with a screw independently of the perforated part.

What I claim as my invention, and desire to secure by Letters Patent, is—

1. The combination, with a battery element, of a nut section or abutment separated slightly from its face, and a screw-connection for the attachment of a wire inserted parallel with the face of the element and between it and the nut section or abutment, as in a nut, substantially as herein described.

2. The combination, with a battery element, of a nut section or abutment separated slightly from its face, a screw connection inserted parallel with the face of the element and between it and the nut section or abutment, as in a nut, and a strip of thin metal interposed between said screw and the face of the element, substantially as herein described.

3. The combination, with a battery element having an opening, $b'$, of the washer $c$, bearing on one side of the element and having a looped or slotted shank extending through the opening, and a screw-connection inserted parallel with the face of the element and through said looped or slotted shank and fitting, as in a nut, between the element and the concave bearing afforded in the shank, substantially as herein described.

4. The combination, with a battery element having an opening, $b'$, of the washer $c$, and the open-wire looped shank projecting therefrom and through the opening, and the screw inserted through the looped shank and parallel with the face of and bearing against the element, substantially as herein described.

PATRICK BOWE.

Witnesses:
CHARLES W. FISK,
BENJAMIN W. WILBUR.